United States Patent [19]

Herman et al.

[11] Patent Number: 4,457,516

[45] Date of Patent: Jul. 3, 1984

[54] UNIVERSAL SLEEVE

[75] Inventors: Samuel R. Herman, Cypress; Louis B. Fischer; Tustin, both of Calif.

[73] Assignee: McDonnell Douglas Corporation, Long Beach, Calif.

[21] Appl. No.: 364,431

[22] Filed: Apr. 1, 1982

[51] Int. Cl.³ .......................... F16L 5/00; F16L 3/22; F16J 15/00; B65D 53/00

[52] U.S. Cl. .................................... 277/12; 277/53; 277/237 R; 248/56; 248/68.1

[58] Field of Search ............ 2/DIG. 6; 24/31 V, 140, 24/204, DIG. 18; 297/DIG. 6; 428/92, 99, 100; 277/237, 12, 32, 53; 248/68 R, 56, 68 CB; 255/100; 403/192; 206/344, 330; 128/DIG. 15

[56] References Cited

U.S. PATENT DOCUMENTS

| | | | |
|---|---|---|---|
| 2,813,692 | 11/1957 | Brewer et al. | 248/56 |
| 3,299,543 | 1/1967 | Merritt | 24/140 |
| 3,503,101 | 3/1970 | Kolozsvary | 24/204 X |
| 3,696,472 | 10/1972 | Perina et al. | 24/204 X |
| 4,033,527 | 7/1977 | Parsons | 244/99 |

Primary Examiner—Stuart S. Levy
Assistant Examiner—Lloyd D. Doigan
Attorney, Agent, or Firm—John P. Scholl; George W. Finch; Donald L. Royer

[57] ABSTRACT

A universal sleeve for use in an air recirculation barrier to seal off the passage of air around penetrating components comprising a flexible piece of material joined along two edges to enclose the components passing thru the barrier. The engaging edges of the flexible material has Velcro tape of hook and pile construction to closely surround penetrating components and limit the passage of air along the components thru the barrier. Sealing tape may be used on the edges of the flexible material to further seal off the passage of air.

2 Claims, 2 Drawing Figures

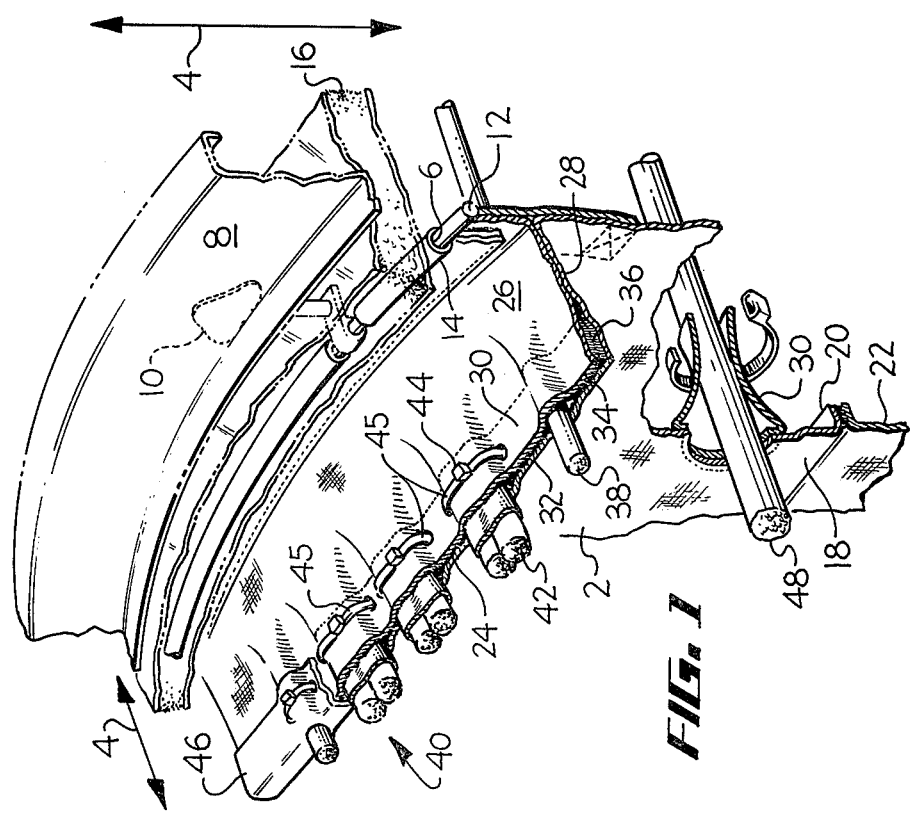

UNIVERSAL SLEEVE

BACKGROUND OF THE INVENTION

In order to heat and ventilate modern aircraft, flow patterns are set up for the recirculation of cabin air. Effective pathways and barriers which limit the recirculated air result in reducing the quantity of air required and consequently the power necessary to cause the recirculation of this air. A reduction in power results in a conservation of fuel and more cost effective operation of the aircraft. In addition, well designed recirculation barriers limit the passage of smoke, odors and fumes which may be unpleasant or noxious to the crew and passengers.

One area in which a barrier is required to limit the recirculation of air is between the overhead liner of the passenger compartment and the top skin of the aircraft. This overhead passageway is used for air ducting, control wires, hydraulic lines and electrical lines. Various air carriers require different configurations of the aircraft and consequently different hydraulic line and wiring patterns through the overhead passage way and across the air recirculation barrier. Several different recirculation barriers were required to meet the diverse interior wiring patterns. These barriers were costly to produce and in many instances had to be modified at a subsequent date to accommodate additional wiring.

In the past, large bundles of wire or conduits were passed through the air recirculation barrier by penetration seals at designated points. These penetration seals or envelopes are still used to surround large diameter semifixed components as they pass through the barrier. These penetration seals are costly to construct and limit the location of the major components to specific paths. The inventive universal sleeve as used in the air recirculation barrier handles individual wires, small bundles and small hydraulic lines which may have indefinite locations and paths thru the recirculation barrier.

The inventive universal sleeve is designed to permit the use of a single recirculation barrier on several different models of aircraft and to accommodate diverse hydraulic line and wiring patterns. The universal sleeve also permits modifications of the hydraulic and wiring patterns at a later time.

The inventive universal sleeve has a opening to permit random passage of hydraulic lines or wires. The sleeve is comprised of a layer or flap of fabric material which is joined to close off a large hole in the fabric air recirculation barrier. The flap is held together by Velcro edging of hook and pile-type tape. This Velcro tape is continuously applied along the edge of the flap.

When single wires, small bundles or hydraulic lines of small diameter pass through the universal sleeve the holding ability of the Velcro hook and pile ends on the tape are sufficient to seal the opening in the universal sleeve. When larger bundles or tubes, on the order of ½ inch in diameter, are used tie straps are looped around the Velcro taped edges and pinch the Velcro around the circumference of the larger bundles or tubes to seal off the flow of air. An air recirculation barrier, which substantially eliminates the passage of any air, smoke or fumes, across the barrier may be constructed by the use of sealing tape applied over the Velcro edge surfaces to close the opening in the universal sleeve.

BRIEF DESCRIPTION OF THE DRAWINGS

FIG. 1 is a perspective view of a portion of a recirculation barrier with the universal sleeve in place providing a penetration envelope for electrical wires and hydraulic lines, and FIG. 2 is a plan view of a portion of the universal sleeve of FIG. 1.

DESCRIPTION OF THE PREFERRED EMBODIMENT

Referring to FIG. 1 a fabric air recirculation barrier 2 is located in a tunnel or passageway between the ceiling of the cabin compartment and upper outside surface of the aircraft body. It is designed to limit the passage of air along the tunnel indicated by the double-ended arrow 4.

The upper edge 6 of the recirculation barrier 2 is attached to a fuselage frame 8. The attachment is made by a hanger 10 on the fuselage frame 8 which engages a rod 12 located in a sleeve 14 in the air recirculation barrier 2. This hanger attachment compresses a layer of cabin insulation 16 between the fuselage frame 8 and the upper edge 6 of the recirculation barrier 2 limiting airflow above the air recirculation barrier 2.

The lower edge 18 of the air recirculation barrier 2 is attached by Velcro tape 20 (hook and pile) on its lower edge 18 to a cabin ceiling header 22.

An opening 24 is located in the center of the air recirculation barrier 2. The opening 24 is covered by two flaps 26 and 28 of flexible material which surround penetrating wires and hydraulic lines. A single piece of material folded on itself could be used to produce the two flaps 26 and 28. The flaps 26 and 28 may be sewn into the barrier or attached to the air recirculation barrier by other conventional means. On the outside edges 30 and 32 of these flaps 26 and 28 are engaging tapes 34 and 36 of Velcro hook and pile material. When a small wire 38, bundle or hydraulic line passes through the universal sleeve 40 in the barrier 2 the Velcro tape on the flaps are pressed around the wire 38, etc. and the Velcro tape holds itself closely against the wire with sufficient strength to limit the passage of air along the wire thru the barrier.

When a larger wire 42, bundle or conduit in excess of ½ inch in diameter passes through the universal sleeve 40 in the barrier 2 a tie strap 44 is inserted thru small eyelet holes 45 in the edge of the flap and Velcro tape to cinch the Velcro edges against the circumference of the large diameter bundle 44 (component) and prevent the passage of air along the component thru the air recirculation barrier.

When it is desirable to prevent even small amounts of air passing thru the universal sleeve a sealing tape 46 may be used to cover the joined edges 26 and 28 of the flaps along with engaging Velcro surfaces. A portion of the barrier 2 is shown with sealing tape 46 to illustrate the placement of the tape 46.

A large diameter conduit 48 is shown passing thru the lower portion of the air recirculation barrier 2 in a prior art penetration seal 50.

FIG. 2 represents a plan view of FIG. 1 and shows the passage of the wires through the Velcro taped edges of the universal sleeve. The larger diametered components 52 and 54 have tie straps 44 located thru the Velcro taped edges of the flaps 26 and 28.

While certain exemplary embodiments of this invention have been described and shown in the accompanying drawings, it is to be understood that such embodiments are merely illustrative of, and not restrictive on, the broad invention to the specific desire to be limited in my invention to the specific constructions or arrangements shown and described, since various other obvious modifications may occur to persons having ordinary skill in the art.

What is claimed is:

1. A universal sleeve for use in an opening in an air recirculation barrier to surround penetrating components and limit the flow of air around the components thru the barrier comprising:

a flexible flap attached to said recirculation barrier and positioned in the opening of said barrier said flap having an opening therein closed by two edges, and hook and pile tapes located along the facing edges of said flap to engage each other and seal the opening in said barrier and seal said flap around the penetrating components, and small eyelet openings located in the edge of said flap and in said hook and pile tapes on the edge of the flap, and Tie straps to pass through said openings and hold the taped edges closely surrounding the circumference of the penetrating components.

2. The sleeve of claim 1 having sealing tape applied along the edges of the flap to assist in preventing the passage of air through the opening in said barrier and around the penetrating components.

* * * * *